US010544376B2

United States Patent
Prok et al.

(10) Patent No.: US 10,544,376 B2
(45) Date of Patent: *Jan. 28, 2020

(54) RAPID METHOD FOR PRODUCTION OF CERIUM-CONTAINING OXIDE ORGANIC COLLOIDS

(71) Applicant: CERION, LLC, Rochester, NY (US)

(72) Inventors: Gary Robert Prok, Rush, NY (US); Stephen Charles Williams, Rochester, NY (US)

(73) Assignee: Cerion, LLC, Rochester, NY (US)

( * ) Notice: Subject to any disclaimer, the term of this patent is extended or adjusted under 35 U.S.C. 154(b) by 81 days.

This patent is subject to a terminal disclaimer.

(21) Appl. No.: 14/875,088

(22) Filed: Oct. 5, 2015

(65) Prior Publication Data

US 2016/0168495 A1 Jun. 16, 2016

Related U.S. Application Data

(63) Continuation of application No. 13/756,971, filed on Feb. 1, 2013, now abandoned, which is a
(Continued)

(51) Int. Cl.
*C01F 17/00* (2006.01)
*C10L 1/12* (2006.01)
(Continued)

(52) U.S. Cl.
CPC ........ *C10L 1/1233* (2013.01); *C01G 49/0054* (2013.01); *C10L 1/10* (2013.01);
(Continued)

(58) Field of Classification Search
CPC .. C10L 1/1233; C10L 1/10; C10L 1/18; C10L 1/1826; C10L 1/1852;
(Continued)

(56) References Cited

U.S. PATENT DOCUMENTS 3,301,790 A * 1/1967 Fitch et al. .......... B01J 13/0026
252/634
4,545,923 A 10/1985 Gradeff
(Continued)

FOREIGN PATENT DOCUMENTS

AU 698799 8/1995
FR 2716388 8/1995
(Continued)

OTHER PUBLICATIONS

Hawley's Condensed Chemical Dictionary, (2007), 75, 499, and 966; John Wiley & Sons, Inc. Online @ http://onlinelibrary.wiley.com/book/10.1002/9780470114735/titles headwords = Amphiphilic, Emulsion, Phase (downloaded Jul. 21, 2017), p. 1.*
(Continued)

*Primary Examiner* — Michael A Salvitti
(74) *Attorney, Agent, or Firm* — RatnerPrestia (57) ABSTRACT

Improved methods for producing colloidal dispersions of cerium-containing oxide nanoparticles in substantially non-polar solvents are disclosed. The cerium-containing oxide nanoparticles of an aqueous colloid are transferred to a substantially non-polar liquid comprising one or more amphiphilic materials, one or more low-polarity solvents, and, optionally, one or more glycol ether promoter materials. The transfer is achieved by mixing the aqueous and substantially non-polar materials, forming an emulsion, followed by a phase separation into a remnant polar solution phase and a substantially non-polar organic colloid phase. The organic colloid phase is then collected.

15 Claims, 1 Drawing Sheet

Related U.S. Application Data continuation-in-part of application No. 13/753,992, filed on Jan. 30, 2013, now Pat. No. 9,669,375.

(60) Provisional application No. 61/632,778, filed on Jan. 30, 2012.

(51) Int. Cl.

| | | |
|---|---|---|
| *C10L 10/00* | (2006.01) | |
| *C10L 1/185* | (2006.01) | |
| *C10L 1/188* | (2006.01) | |
| *C10L 1/10* | (2006.01) | |
| *C10L 1/182* | (2006.01) | |
| *C10L 10/02* | (2006.01) | |
| *C01G 49/00* | (2006.01) | |
| *C10L 1/18* | (2006.01) | |
| *C10M 125/10* | (2006.01) | |
| *C10M 129/16* | (2006.01) | |
| *C10M 129/40* | (2006.01) | |

(52) U.S. Cl.
CPC ............. *C10L 1/18* (2013.01); *C10L 1/1826* (2013.01); *C10L 1/1852* (2013.01); *C10L 1/1881* (2013.01); *C10L 10/00* (2013.01); *C10L 10/02* (2013.01); *C10M 125/10* (2013.01); *C10M 129/16* (2013.01); *C10M 129/40* (2013.01); *C01P 2002/85* (2013.01); *C01P 2004/04* (2013.01); *C01P 2004/64* (2013.01); *C10L 2200/0245* (2013.01); *C10L 2200/0254* (2013.01); *C10L 2290/24* (2013.01)

(58) Field of Classification Search
CPC ........ C10L 1/1881; C10L 10/00; C10L 10/02; C10L 2200/0245; C10L 2200/0254; C10L 2290/24; C01G 49/0054; C10M 125/10; C10M 129/16; C10M 129/40; C01P 2002/85; C01P 2004/04; C01P 2004/64; C01F 17/0043; B01J 2523/3712
See application file for complete search history.

(56) References Cited

U.S. PATENT DOCUMENTS

| | | | | |
|---|---|---|---|---|
| 4,568,360 | A | 2/1986 | Brisset et al. | |
| 4,599,201 | A * | 7/1986 | Gradeff et al. | C07C 51/412 423/21.1 |
| 4,647,401 | A * | 3/1987 | Gradeff et al. | C01F 17/0012 106/267 |
| 4,981,819 | A * | 1/1991 | Rinn | C01B 13/328 501/12 |
| 5,449,387 | A * | 9/1995 | Hawkins et al. | B01J 23/10 44/354 |
| 6,136,048 | A | 10/2000 | Chimie | |
| 6,210,451 | B1 | 4/2001 | Chopin | |
| 6,271,269 | B1 * | 8/2001 | Chane-Ching | B01J 13/0026 516/33 |
| 6,649,156 | B1 | 11/2003 | Chane-Ching | |
| 6,811,723 | B1 * | 11/2004 | Aupaix et al. | A61K 8/02 106/287.19 |
| 7,459,484 | B2 | 12/2008 | Blanchard | |
| 8,506,657 | B2 * | 8/2013 | Blanchard | C10L 1/10 44/364 |
| 8,679,344 | B2 | 3/2014 | Allston | |
| 8,883,865 | B2 | 11/2014 | DiFrancesco | |
| 9,669,375 | B2 * | 6/2017 | Prok | B01J 13/0047 |
| 2006/0005465 | A1 | 1/2006 | Blanchard | |
| 2010/0152077 | A1 * | 6/2010 | Allston | B01D 61/243 508/165 |
| 2010/0242342 | A1 | 9/2010 | Reed | |
| 2012/0117863 | A1 * | 5/2012 | Cowdery-Corvan et al. | B82Y 30/00 44/530 |
| 2013/0109600 | A1 | 5/2013 | Reed | |
| 2013/0192122 | A1 * | 8/2013 | Prok | C10L 10/00 44/280 |
| 2013/0197107 | A1 * | 8/2013 | Prok | B01J 13/0047 516/33 |
| 2015/0059236 | A1 | 3/2015 | DiFrancesco | |
| 2015/0059237 | A1 | 3/2015 | DiFrancesco | |
| 2016/0168495 | A1 * | 6/2016 | Prok | C10L 10/00 508/170 |

FOREIGN PATENT DOCUMENTS

| | | |
|---|---|---|
| GB | 1571210 | 7/1980 |
| JP | S53012907 | 2/1978 |
| JP | S59172592 A | 9/1984 |
| JP | 6238236 A | 2/1987 |
| JP | 7284651 A | 10/1995 |
| JP | 11501609 A | 2/1999 |
| JP | 2003506529 A | 2/2003 |
| WO | 2013116300 | 8/2013 |

OTHER PUBLICATIONS

Shugar et al., Chemical Technicians Ready Reference Handbook, 2nd Edition, (1981) McGraw-Hill, Inc., NY, NY, USA, pp. 303-317.*

Hawley's Condensed Chemical Dictionary, (2007), John Wiley & Sons, Inc. Online @ http://onlinelibrary.wiley.com/mrw/advanced/search?doi=10.1002/9780470114735 , downloaded Sep. 26, 2014), pp. 1-4.*

Australian First Examination Report dated Jul. 15, 2016 for Australian Application No. 2013214899, 4 pages.

JP Office Action/Reasons for Rejection, with English language translation for Application No. 2014-555752, dated Feb. 9, 2017, 10 pages.

Notice of Reasons for Rejection for Japanese Application No. 2014-555663, dated Feb. 28, 2017, with English translation, 10 pages.

EP Examination Report dated Feb. 11, 2016 for EP Application No. 13704313.9.

Australian First Examination Report dated Jul. 18, 2016 for Australian Application No. 2013215258, 3 pages.

Entire patent prosecution history of U.S. Appl. No. 13/753,992, filed Jan. 30, 2013, entitled, "Method for Production of Stable Cerium Oxide Organic Colloids."

Entire patent prosecution history of U.S. Appl. No. 13/756,971, filed Feb. 1, 2013, entitled, "Rapid Method for Production of Cerium-Containing Oxide Organic Colloids ."

International Search Report and Written Opinion corresponding to PCT/US2013/023790, dated Aug. 6, 2013.

International Search Report and Written Opinion corresponding to PCT/US2013/024342, dated Oct. 1, 2013.

Machine translation of Publ. No. FR 2 716 338 (A1), published Aug. 25, 1995, European patent Office, obtained online @ http://worldwide.espacenet.com/publicationDetails/claims?CC=FR&NR=2716388A1&KC=A1&FT=D&ND=3&date=19950825&DB=worldwide.espacenet.com&locale=en+EP (downloaded Sep. 16, 2014), pp. 1-21.

International Preliminary Report on Patentability for Corresponding PCT/US2013/023790, dated Aug. 5, 2014.

International Preliminary Report on Patentability for Corresponding PCT/US2013/024342, dated Aug. 5, 2014.

Notice of Reasons for Rejection for Japanese Application No. 2014-555752, dated Sep. 8, 2017 with translation, 6 pages.

European Communication Pursuant to Article 94(3) EPC for European Application No. 13704535.7, dated Sep. 27, 2018, 4 pages.

Canadian Examination Report for Canadian Application No. 2,862,356, dated Dec. 27, 2018, 4 pages.

European Communication Pursuant to Article 94(3) EPC, for European Application No. 13 704 535.7, dated Mar. 26, 2019, 5 pages.

(56) References Cited

OTHER PUBLICATIONS

Canadian Office Action for Canadian Application No. 2,862,337, dated Dec. 4, 2018, 4 pages.
European Communication for European Application No. 13 704 535.7, dated Mar. 16, 2018, 6 pages.

* cited by examiner

US 10,544,376 B2

RAPID METHOD FOR PRODUCTION OF CERIUM-CONTAINING OXIDE ORGANIC COLLOIDS

CROSS-REFERENCE TO RELATED APPLICATIONS

This application is a continuation of U.S. patent application Ser. No. 13/756,971, RAPID METHOD FOR PRODUCTION OF CERIUM-CONTAINING OXIDE ORGANIC COLLOIDS, filed Feb. 1, 2013, which itself is a continuation-in-part of U.S. patent application Ser. No. 13/753,992, IMPROVED METHOD FOR PRODUCTION OF STABLE CERIUM OXIDE ORGANIC COLLOIDS, filed Jan. 30, 2013, which claims priority to U.S. Provisional Application No. 61/632,778, filed Jan. 30, 2012, the disclosures of which are incorporated herein by reference in its entirety. This application also claims the benefit of priority to Provisional Application Ser. No. 61/632,881, METHOD FOR PRODUCTION OF STABLE CERIUM OXIDE ORGANIC COLLOIDS, filed Feb. 1, 2012, the disclosure of which is incorporated herein by reference in its entirety.

FIELD OF THE INVENTION

The present invention relates generally to colloidal nanoparticle dispersions and more specifically to improved processes for the manufacture of doped and un-doped cerium oxide colloidal dispersions in solvents having low-polarity.

BACKGROUND OF THE INVENTION

Cerium-containing oxide nanoparticles have many current industrial uses, along with many emerging technical applications. They are well known as important components, for example, in three-way automotive exhaust catalysts, automotive fuel borne catalysts, water gas shift reaction catalysts, polishing and planarization agents, solid oxide fuel cells, hybrid solar cells and ultra-violet sun blockers. There are many synthetic processes for the production of metal oxides, including aqueous and hydrothermal precipitation, spray precipitation, combustion, plasma deposition and electrochemical techniques, among others. While a variety of solvents may be used in these synthetic processes, aqueous reaction chemistries are particularly favored in manufacturing processes where high material through-put is desired. However, conventional aqueous processes—precipitation in particular—are costly as they involve multiple steps that are often time and energy consuming, as well as equipment intensive.

Conventional large-scale metal oxide manufacturing processes can typically be divided into three stages: aqueous precipitation of precursor compounds, calcination to promote chemical reaction and to enhance crystallinity, followed by final particle size adjustment. In more detail, aqueous precipitation includes the initial steps of reactant delivery, reactant dispersal, particle precipitation, isolation, washing, drying, and optional impregnation with other metal ions; calcination involves heating to 400-1000° C. for several hours; followed by grinding, milling or classification to adjust the final particle size, among other steps.

One approach to reduce the number of steps in the aqueous preparation is to employ methods that produce a stable aqueous dispersion (suspension, colloid, sol) of the final particles directly from the initial reactants, thereby avoiding the time, cost and potential contamination inherent in the particle precipitation, isolation, and drying steps. Moreover, if the particles produced in such a direct method are sufficiently pure, wherein the chemical composition of the particles is as desired, and the particles are sufficiently crystalline, then the calcination step may also be eliminated. In addition, if the particle size and size distribution produced by such a direct method are substantially as desired, then the grinding, milling and classification steps may also be eliminated. Direct methods to produce aqueous dispersions (suspensions, colloids, sols) of crystalline cerium-containing oxide nanoparticles without the use of precipitation, isolation, drying, calcination, grinding, milling or classification steps, and the like, are described in commonly assigned U.S. patent application Ser. No. 12/779,602, now Publication US 2010/0242342 A1, by A. G. DiFrancesco et al. The '342 reference discloses stable aqueous dispersions of crystalline cerium-containing nanoparticles in a size range, for example, of 1-5 nanometers.

While substantial progress has been made in eliminating manufacturing steps from the synthetic process by which stable aqueous dispersions of metal oxide nanoparticles are prepared, use of these nanoparticles in applications such as fuel-borne combustion catalysts requires that dispersions of these nanoparticles also exhibit colloidal stability in the fuel. Such stability would also be required for a fuel additive, miscible in the fuel. Thus, these particles, although readily formed and suspended in a highly polar aqueous phase, must then be transferred to a substantially non-polar phase, a process known as solvent shifting. This problem is conventionally addressed by the use of particle stabilizers. However, most particle stabilizers used to prevent particle agglomeration in an aqueous environment are ill-suited to the task of stabilization in a non-polar environment. When placed in a non-polar solvent, such particles tend to immediately agglomerate and, consequently, lose some, if not all, of their desirable particulate properties. Changing stabilizers can involve a difficult displacement reaction or separate, tedious isolation and re-dispersal methods such as, for example, precipitation and subsequent re-dispersal with a new stabilizer using, for instance, a ball milling process, which can take several days and tends to produce polydisperse size frequency distributions.

One approach to simplifying the solvent shifting process employs diafiltration methods and glycol ether solvents having a polarity intermediate between that of water and those of non-polar hydrocarbons. The intermediate polarity colloid is then further shifted to reduce the polarity of the cerium-containing nanoparticle dispersion, as disclosed in commonly assigned U.S. patent application Ser. No. 12/549,776, now Publication US 2010/0152077A1 to Alston et al. Diafiltration, sometimes referred to as cross-flow microfiltration, is a tangential flow filtration method that employs a bulk solvent flow that is tangential to a semi-permeable membrane. However, drawbacks of diafiltration methods include the following: relatively slow filtration rates, substantial financial investment in equipment (e.g. pumps and microfilters), and production of a relatively large amount (e.g. several turnover volumes) of waste solvent.

Use of promoter agents to accelerate transfer of iron oxide nanoparticles from aqueous to non-polar solvents is known in the art. U.S. Pat. No. 7,459,484 to Blanchard et al. discloses use of promoter materials having alcohol functionality and having 6 to 12 carbon atoms to promote transfer, and to improve stability of the organic colloid so formed. US Patent Application Publication 2006/0005465 A1 to Blanchard et al. discloses contact of basic aqueous colloids of rare earth or mixed rare earth/other oxide nanoparticles with an acid and a diluent to form an organic colloid dispersion. U.S. Pat. No. 6,271,269 to Chane-Ching et al. discloses direct transfer of cerium oxide or doped cerium oxide colloidal particles from a counterpart aqueous dispersion. Use of alcohol-based promoters is disclosed as well. However, high process temperatures and times for the transfer of the colloidal particulates represent a significant limitation of the prior art process. It is also apparent that concern over the presence of ionic constituents, and other materials needed to bring about the formation of the colloidal particulate material in the aqueous reaction mixture, affects the viability of the direct process.

Thus, progress has been achieved in reducing the cost of producing and solvent shifting aqueous dispersions of cerium-containing nanoparticles. However, further improvements in manufacturing efficiency are desired, particularly in the case of nanoparticle dispersions used as fuel-borne combustion catalysts that require dispersion stability in both a low-polarity solvent carrier of a fuel additive or in the fuel itself.

It would be very desirable to transfer oxide nanoparticles directly from the aqueous reaction mixture in which the nanoparticles are formed, to a substantially non-polar phase, at low temperatures, to reduce manufacturing hazards in dealing with combustible liquids. At the same time it is desirable that the nanoparticle colloidal dispersions that are the fuel additives exhibit excellent colloidal stability and good fluid flow properties at low ambient temperatures.

SUMMARY OF THE INVENTION

The present invention has various embodiments that provide simple, rapid, low temperature processes for the production of stable doped or un-doped cerium oxide nanoparticle dispersions in solvent systems having low-polarity.

In a first aspect, the invention is directed to an improved process that uses conventional cerium-containing oxide aqueous nanoparticle dispersions. The nanoparticles of the aqueous dispersion are transferred to a substantially non-polar liquid comprising one or more amphiphilic materials, one or more low-polarity solvents, and, optionally, a glycol ether promoter material. The transfer is achieved by mixing the aqueous dispersion and substantially non-polar liquid, wherein an emulsion is formed, followed by a phase separation into a remnant polar solution phase and a substantially non-polar dispersion phase, and then a collection of the substantially non-polar (low-polarity) dispersion phase. The promoter may function to speed the transfer of nanoparticles to the low-polarity phase. The promoter may accelerate the phase separation, and may also provide improved dispersion stability of the final substantially non-polar dispersion phase. In particular embodiments, the glycol ether promoters reduce the temperature necessary to achieve the phase separation while providing high extraction yield of nanoparticles into the low-polarity phase. Low temperatures and reduced time at temperature during the processing have benefits of lower process energy costs and, moreover, reduced risk of hazard in managing the often combustible organic low-polarity solvents during processing, as well as simplifying equipment and facility requirements.

In at least one embodiment, a process for preparing a colloidal dispersion, comprises:
  (a) preparing an aqueous colloidal dispersion of cerium-containing oxide nanoparticles;
  (b) adding a substantially non-polar solvent, an amphiphilic material, and, optionally, at least one glycol ether;
  (c) mixing the liquid mixture of step (b) to form an emulsion;
  (d) heating the emulsion to a predetermined temperature for a predetermined time, thereafter the emulsion separates into a substantially non-polar colloidal phase and a remnant aqueous phase; and,
  (e) collecting the separated substantially non-polar colloidal dispersion of cerium-containing oxide nanoparticles.

In a second aspect, the invention is directed to an improved process wherein conventional cerium-containing oxide nanoparticle precipitates are collected from an aqueous reaction mixture in which they were formed. Collection can be by filtration, centrifugation, and the like, and may include washing to remove unwanted constituents from the aqueous reaction mixture. The washed nanoparticulates may then be in the form of a powder or a paste. The nanoparticles are then re-dispersed into an aqueous phase. The nanoparticles of the aqueous dispersion are transferred to a substantially non-polar liquid comprising one or more amphiphilic materials, one or more low-polarity solvents, and a glycol ether promoter material. The transfer may be achieved by mixing the aqueous dispersion and substantially non-polar liquid, wherein an emulsion is formed, followed by a phase separation into a remnant polar solution phase and a substantially non-polar dispersion phase, and then a collection of the substantially non-polar (low-polarity) dispersion phase. The promoter may function to speed the transfer of nanoparticles to the low-polarity phase. The promoter may accelerate the phase separation, and may also provide improved dispersion stability of the final substantially non-polar dispersion phase. In particular embodiments, the glycol ether promoters reduce the temperature necessary to achieve the phase separation while providing high extraction yield of nanoparticles into the low-polarity phase. Low temperatures and reduced time at temperature during the processing may provide benefits of lower process energy costs and, moreover, reduced risk of hazard in managing the often combustible organic low-polarity solvents during processing, as well as simplifying equipment and facility requirements.

In a third aspect, the invention provides an improved process wherein conventional steps of aqueous nanoparticle isolation and washing may be eliminated, dramatically simplifying prior art processes, the inventive process reduces the process temperatures while reducing process waste, to significant economic advantage. Process simplification may be achieved by directly using the aqueous colloid resulting from the nanoparticle synthesis reaction mixture for extraction of nanoparticles to form the substantially non-polar dispersion. The aqueous colloid may be mixed with a substantially non-polar solvent or mix of solvents, along with one or more amphiphilic materials and a glycol ether promoter material, to form an emulsion. The emulsion separates rapidly at low process temperatures into a low-polarity colloid phase and a remnant aqueous solution phase. The substantially non-polar colloid may be collected, thereby achieving a stable substantially non-polar dispersion, nearly entirely free of contaminants present in the aqueous phase. The promoter material may function to accelerate the separation of the emulsion while lowering the process temperature, to stabilize the low-polarity dispersion, and, in some embodiments, to achieve desired low temperature flow characteristics for the low-polarity dispersion.

In another aspect, the invention relates to a variant of the first aspect, wherein the addition of the glycol ether promoter follows an aging (i.e. holding) period for the emulsion formed from mixing the aqueous dispersion phase, the substantially non-polar solvent, and the amphiphilic material.

In another aspect, the inventive transfer process of cerium-containing oxide nanoparticles from an aqueous dispersion phase to a substantially non-polar dispersion phase may be accomplished at low process temperatures and/or with substantially complete transfer of nanoparticles to the substantially non-polar dispersion phase.

In a further aspect, the invention provides cerium-containing oxide nanoparticles in a stable, substantially non-polar dispersion at low process temperatures, and having desired low temperature flow and other characteristics, by further addition of a glycol ether compound, or a mix of such compounds, to the separated substantially non-polar dispersion.

In yet another aspect, the inventive transfer process provides a substantially non-polar dispersion of cerium-containing oxide nanoparticles by a rapid, complete transfer of nanoparticles, with excellent dispersion stability over the useful operating temperature range of the dispersion.

In still another aspect, with the use of particular amphiphilic materials, such as heptanoic acid or octanoic acid, extraction of nanoparticles from the aqueous colloid phase, and separation of the aqueous and substantially non-polar colloidal phases, occur at room temperature in seconds, with no need for the additional cost or complexity of promoter materials. In addition, use of these particular amphiphilic materials (e.g. heptanoic acid and octanoic acid) also provide high extraction yield of nanoparticles into the low polarity organic phase.

In a still further aspect, the invention is directed to the processes set forth above, wherein the substantially non-polar dispersion of nanoparticles comprising cerium and iron oxides, is a fuel additive. The fuel additive produced by the inventive process is characterized as having reduced contamination from ionic constituents, aqueous stabilizer material, and free water, wherein such components originate in the aqueous synthetic reaction mixture.

DETAILED DESCRIPTION OF THE INVENTION

For effectiveness in many end-use applications, nanoparticle size distributions with mean diameters ranging from below about 100 nm to below about 3 nm are useful.

As used herein, the terms dispersion, colloid, suspension, sol, colloid dispersion, and colloidal dispersion are used interchangeably to mean a stable biphasic mixture of a discontinuous phase (e.g., nanoparticles) within a continuous phase (e.g., liquid or other solvent medium).

As used herein, the term cerium-containing oxide includes doped and un-doped cerium oxides. Doped cerium oxide compounds include those with the formula $Ce_{(1-x)}M_xO_{(2-\delta)}$ where M is a divalent or trivalent metal and $\delta$ is indicative of oxygen vacancies. It should be recognized by one skilled in the chemical art that dopant metal M, in addition to being either substitutionally or interstitially doped into the cerium oxide crystal structure, could be present as oxides of metal M, either as separate nanoparticles or nanocrystals, or as nanoparticles or nanocrystals in agglomeration (composite) with other doped or un-doped cerium oxide nanocrystals. In various embodiments, nanoparticles comprised of crystalline substitutionally doped or un-doped cerium oxide phases, are present. In other embodiments, nanoparticles comprised of non-crystalline metal oxide phases, such as amorphous iron oxide phases, are present. In various embodiments, dopant metal M is Fe, Zr, Pd, Pt, Ag, Co, Cu, and Ni. In particular embodiments, nanoparticles of a nominal composition of $Ce_{(1-x)}Fe_xO_{(2-\delta)}$ wherein x ranges from about 0.01 to 0.8, or from about 0.5 to 0.7, and (2-δ) ranges from about 1 to 2, such as, for example, from about 1.5 to 2, are employed in the inventive process.

The invention relies in part, on the discovery of the effectiveness of certain glycol ethers in aiding the extraction or transfer of doped or un-doped cerium oxide nanoparticles or mixtures thereof from aqueous to substantially non-polar solvents, at low process temperatures. In particular, the choice of a glycol ether, such as diethylene glycol monomethyl ether (DEGME), has been discovered by the inventors to accelerate the phase separation of aqueous and substantially non-polar colloid phases formed by the mixing of aqueous colloidal solutions with substantially non-polar materials (liquids) including a low-polarity solvent or mix of low-polarity solvents, one or more amphiphilic materials, and one or more specific glycol ethers. The mixing of the aqueous colloid and the substantially non-polar materials (liquids) provides an emulsion. In the presence of certain particular glycol ethers, the emulsion separates at room temperature or modestly elevated temperatures into an aqueous solution phase and a substantially non-polar colloid containing substantially all of the nanoparticles from the aqueous colloid, the amphiphilic material, and a portion of the glycol ether. In particular embodiments, wherein the nanoparticles exhibit substantial coloration, the efficiency or degree of transfer of the nanoparticles from the aqueous phase to the non-polar phase, may be qualitatively assessed by visual observation.

In particular embodiments, additional glycol ether materials may be added to the substantially non-polar colloid to enhance colloidal stability, to enhance low temperature flow properties, and/or to raise the flashpoint temperature of the substantially non-polar colloid. In other embodiments, materials useful for modifying the low temperature flow characteristics and flash points the substantially non-polar colloid include low molecular weight organic liquids such as alcohols and diols.

In particular embodiments, the glycol ether promoter may reduce the temperature necessary to achieve phase separation while providing high extraction yield of nanoparticles to the organic phase. Low temperatures and lower time at temperature during the processing have benefits of lower process energy costs and, moreover, reduced risk of hazard in managing the organic combustible materials during processing, as well as simplifying equipment and facility requirements.

The invention also relies in part, on the discovery of the effectiveness of heptanoic acid or octanoic acid in aiding the extraction or transfer of cerium-containing oxide nanoparticles or mixtures thereof from aqueous to substantially non-polar solvents, at low process temperatures, and at comparatively very high rates. Use of heptanoic acid or octanoic acid has been shown by the inventors to accelerate the phase separation of aqueous and substantially non-polar colloid phases formed by the mixing of aqueous colloidal dispersions with heptanoic acid or octanoic acid and the substantially non-polar materials including a solvent or combination of solvents. With the use of heptanoic acid or octanoic acid, extraction of nanoparticles from the aqueous colloid phase can occur in seconds, at room temperature in seconds, with no need for the additional cost or complexity of promoter materials. The mixing of the aqueous colloid and heptanoic acid or octanoic acid, alone or in combination with the substantially non-polar solvents, provides an emulsion. In the presence of heptanoic acid or octanoic acid, the emulsion separates at room temperature or modestly elevated temperatures into an aqueous solution phase and an organic colloid containing substantially all of the nanoparticles from the aqueous colloid, and the heptanoic acid or octanoic acid. With the addition of at least one substantially non-polar solvent, the substantially non-polar colloids so-formed, exhibit excellent colloidal stability. To the substantially non-polar colloid, other materials may be added to enhance colloidal stability, to enhance low temperature flow properties, and to raise the flashpoint temperature of the substantially non-polar colloid and to provide other advantages as set forth below.

As mentioned previously, U.S. Pat. No. 6,271,269 to Chane-Ching et al. discloses direct transfer of cerium oxide or doped cerium oxide colloidal particles from a counterpart aqueous dispersion. The range of temperatures disclosed for the transfer reaction is from higher than 60° C. to 150° C., with a preferred range of from 80-100° C. Disclosed examples were carried out at 90° C.

In particular embodiments, substantially non-polar (low-polarity) solvents include, alone or in combination, aliphatic hydrocarbons and mixtures thereof, and alicyclic hydrocarbons and their mixtures. In other embodiments, non-polar solvents include diesel fuel, biodiesel fuel, naphtha, kerosene, gasoline, and commercially available petroleum derivatives such as isoparafin distillates (e.g., Isopar®), hydrotreated petroleum distillates (e.g., Kensol® 48H and Kensol® 50H available from American Refining Group, Ltd of Bradford, Pa. (USA); or Calumet 420-460 available from Calumet Lubricants Co. of Cotton Valley, La. (USA)). Kensol® 48H and 50H are used in particular embodiments as components of fuel-additive applications of the invention because of their low sulfur content, high flashpoint, and low concentration of components having unsaturated bonds. Solvents having some concentration of aromatics, for example, Solvesso® type solvents, may be useful for the purposes of the invention. Low cost may be another driver for the choice of a particularly preferred substantially non-polar solvent. In various embodiments, the substantially non-polar solvent comprises from about 50-65 wt. % of the total substantially non-polar liquid used to form the emulsion mixture.

In particular embodiments, amphiphilic materials include monocarboxylic acids having from 6 to 22 carbon atoms, dicarboxylic acids, polycarboxylic acids, and combinations thereof. In particular embodiments, monocarboxylic acid materials include, for example, oleic acid, stearic acid, linoleic acid, linolenic acid, and isomers thereof, alone or in combination. In other particular embodiments, monocarboxylic acids having from 7 to 9 carbon atoms, for example, heptanoic acid, octanoic acid, nonanoic acid and mixtures thereof, are employed. In particular embodiments, dicarboxylic acids include, for example, derivatives of succinic acid, such as polyisobutylene succinic acid (PIBSA), and anhydrides thereof. The amphiphilic materials may also characterized in that they are soluble in non-polar hydrocarbon diluents, such as kerosene, isoparafin and hydrotreated petroleum distillates, which in turn are compatible with most hydrocarbon fuels, such as gasoline, diesel and biodiesel, and lubricating oils. In various embodiments, the amphiphilic materials comprise from about 25-33 wt. % of the total substantially non-polar liquid used to form the emulsion mixture.

In particular embodiments, glycol ether promoters include, for example, diethylene glycol monomethyl ether (DEGME), propylene glycol monomethyl ether (PGME), diethylene glycol monoethyl ether, diethylene glycol monobutyl ether, dipropylene glycol methyl ether, ethylene glycol monomethyl ether, ethylene glycol monoethyl ether, ethylene glycol monopropyl ether, and mixtures thereof. Choice of particular glycol ether promoters may be based in part on efficacy of low temperature acceleration of extraction of nanoparticles from aqueous to a substantially non-polar phase. It has been found that the level of glycol ether present may be sensitive, there being a threshold for the beneficial acceleration of the separation of the emulsion to give a stable high yield substantially non-polar colloid. Consideration of the miscibility and stability, as will be discussed further below, of the ternary combination of non-polar solvent, amphiphilic agent, and the glycol ether may also be a factor in the determination of the appropriate level of glycol ether in the process and in the final product. Other considerations for the specific choice of and relative amount of glycol ether include satisfying product requirements regarding cost, low temperature flow, flashpoint, and health/environmental considerations. In various embodiments, the glycol ether promoters comprise from about 5-25 wt. % of the total substantially non-polar liquid used to form the emulsion mixture.

The aqueous doped or un-doped cerium oxide colloid that is to be directly transferred or extracted into a non-polar phase could be formed according to a number of known approaches. For example those described in copending U.S. application Ser. No. 12/779,602 now published as US2010/0242342, to Reed et al., incorporated herein by reference, are applicable. In some embodiments of the invention, such an aqueous colloid as formed in its reaction vessel is directly useful for transfer to substantially non-polar colloid phase, even though the aqueous colloids have constituent components comprising reactant remnants and addenda. In other embodiments, nanoparticles formed as aqueous colloids using other well-known processes can be isolated and washed and then re-dispersed in water to form another aqueous colloid that can be used as a starting material for the inventive transfer process discussed herein.

In particular embodiments, the temperature range for the formation of the emulsion, transfer of the nanoparticles between aqueous and substantially non-polar phases, and separation of the emulsion, may range from about 20° C. to 60° C. In a particular embodiment, a temperature of about 40° C. is used because an aqueous colloid in which the nanoparticles are formed directly, will often be substantially above 40° C. at the conclusion of the aqueous nanoparticle synthesis in order to impart high yield and crystallinity in a short amount of time. An aqueous colloid so formed, when combined with the other materials that comprise the non-polar constituents, conveniently at room temperature, will yield an emulsion with a temperature near 40° C. Such low temperatures compared to prior art process temperatures are a significant advantage afforded by the inventive approach. And near this temperature, in particular embodiments, the presence of glycol ether promoters of the invention cause the emulsion to separate into two phases within about 1 to 4 hours, with substantially complete extraction of the nanoparticles from the aqueous phase into the non-polar phase. In still other embodiments, wherein, for example, heptanoic acid or octanoic acid are employed, the emulsion can separate into two phases within about 5 seconds to 10 minutes with substantially complete extraction of nanoparticles from the aqueous phase. It is understood by those skilled in the chemical engineering art, that the time required to complete phase separations will increase as the total volume of the emulsion increases.

In various embodiments, once active mixing of the emulsion is stopped, the emulsion will separate into two phases within about 60 minutes, within about 50 minutes, within about 40 minutes, within about 30 minutes, within about 20 minutes, within about 10 minutes, within about 5 minutes, within about 1 minute, within about 30 seconds, within about 10 seconds, within about 5 seconds.

In a particular embodiment, it has been found that it may be beneficial to age (hold) for a predetermined period of time, the emulsion formed from the mixing of the aqueous cerium-containing oxide colloid, the substantially non-polar solvent, and the amphiphilic material (e.g. organic acid), prior to the addition of the glycol ether promoter. In various embodiments, the aging (holding) temperature is in the range of 20-60° C., and the aging (holding) time is in the range of 0 to 8 hours, 0 to 4 hours, or 0 to 2 hours.

Figure 1:
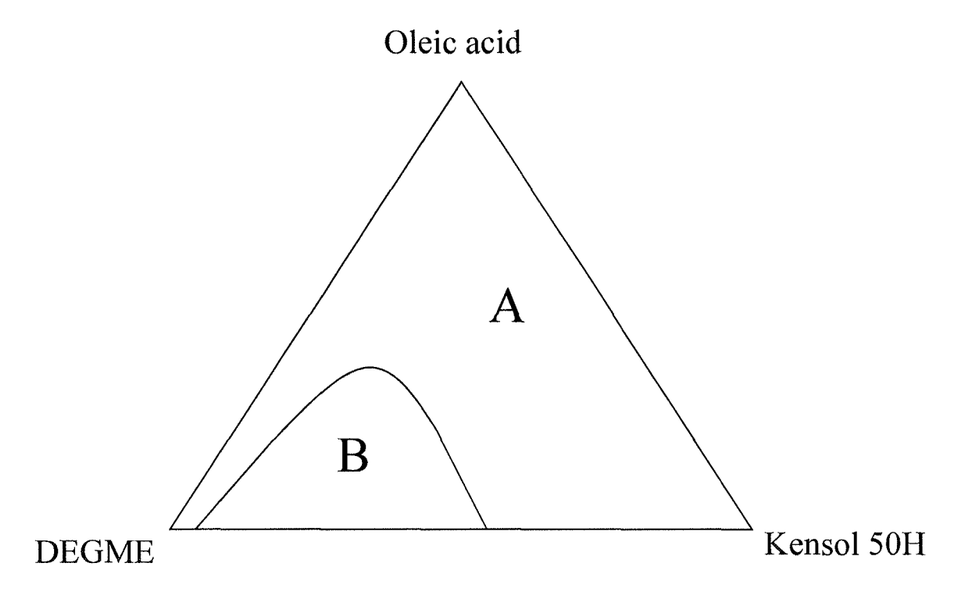
The drawing is a ternary phase diagram representing combinations of a set of exemplary non-polar solvent, amphiphilic agent, and glycol ether promoter, of the invention.

The inventors have explored the ternary phase diagram of a combination liquid comprising a non-polar solvent—Kensol® 50H, an amphiphilic material—oleic acid, and the promoter—DEGME. The drawing depicts the ternary phase diagram for the ternary system at room temperature. Note that there are 2 regions: Region A is characterized by a single-phase liquid in which all three of the components are miscible. Region B is characterized by a separation into 2 liquid phases. It may be preferable to choose the ratio of the 3 constituents to be in the single-phase region, while at the same time optimizing other desirable characteristics of the product, for example, long-term colloidal stability of the organic colloid (sol) product. Colloidal stability over the manufacturing process temperatures and product exposure temperatures, both high and low, may need to be considered. Product characteristics of concern may include flow-ability at low operating temperatures (cold outdoor ambient temperatures) and flash-point at higher potential exposure temperatures. Conveniently and unexpectedly, in some embodiments, product ratios of the three materials of the ternary diagram also provide for an ideal composition for the extraction of nanoparticles from the aqueous colloid to the substantially non-polar colloid.

In some embodiments, it has been found that the low temperature extraction of nanoparticles from the aqueous phase to the substantially non-polar phase is accelerated by forming the emulsion with high shear mixing.

In some embodiments, analysis of the final organic colloid material produced by the inventive process reveals that it is substantially free of constituents of the aqueous reaction mixture in which the nanoparticles were initially formed. Levels of water, nitrates, and nanoparticle stabilizer (e.g. methoxyacetic acid) were all lower than in the comparative process disclosed in the commonly assigned U.S. application Ser. No. 12/549,776 now US Publication 2010/0152077 A1 to Alston et al. Analysis also revealed that a portion of the glycol ether promoter material or materials may be retained in the aqueous phase after phase separation. Optionally, an additional amount of glycol ether is added to the separated substantially non-polar colloid, according to considerations previously stated.

It is well known in the art that extraction of metal oxide nanoparticles for fuel additives from aqueous colloid form to organic colloid form can be accomplished using amphiphilic materials together with non-polar solvents. For example, Blanchard et al. in US 2006/0005465 A1 disclose carboxylic acids having from 10 to 50 carbon atoms, and, in particular, 2-ethylhexnoic acid, as preferred amphiphilic agents. However, in this earlier work the pH of the aqueous metal oxide nanoparticle dispersions remained basic. More specifically, the pH of the reaction mixture (i.e. aqueous metal oxide nanoparticle dispersion) is described therein as being kept to a value of at least 7, more particularly at least 7.5, still more particularly in the range 7.5 to 10.5.

In contrast to the disclosures of US 2006/0005465 A1, embodiments of the invention employ aqueous cerium-containing oxide nanoparticle dispersions that remain acidic. In particular embodiments the pH of the aqueous cerium-containing oxide nanoparticle dispersions are less than 7, less than 6, and less than 5. In a specific embodiment the pH of the aqueous cerium-containing oxide nanoparticle dispersion is about 4.5.

Heptanoic acid ($C_7H_{16}O_2$) and octanoic acid ($C_8H_{18}O_2$) are particular carboxylic acids that give the very surprising result of substantially complete extraction of cerium-containing oxide nanoparticles from an acidic aqueous phase into a substantially non-polar phase, do so at room temperature, and without the use of a promoter (e.g. alcohol or glycol ether). Even more surprising, 2-ethyl hexanoic acid ($C_8H_{18}O_2$), a closely related isomer of octanoic acid, does not function nearly as well as an amphiphilic agent in regard to the rate of extraction of cerium-containing oxide nanoparticles from an acidic aqueous phase to an organic phase, particularly so at room temperature. 2-Ethylhexanoic acid is widely used to prepare metal compounds that are soluble in non-polar organic solvents.

To further illustrate the invention and its advantages, the following examples are given, it being understood that the specific examples are not limiting.

EXPERIMENTAL SECTION

Preparation of $Ce_{0.6}Fe_{0.4}O_{(2-\delta)}$ Aqueous Nanoparticle Dispersion

To an 11 liter round bottom Type-316 stainless steel kettle or reactor with 3 mixing baffles, was added distilled water (Kettle Water), which was maintained at 70° C. Using an impeller, the water was stirred at sufficient speed to provide good mixing. Then 98% methoxyacetic acid was added to the reactor. Two solution introduction jets directed to the impeller blades were put into the reactor and secured. An ammonium hydroxide solution was pumped through one jet at a rate of 69.3 ml/minute. A cerium-iron containing solution (334.5 gram of $Ce(NO_3)_3.6H_2O$ and 207.5 gram of $Fe(NO_3)_3.9H2O$ with distilled water to make 625 ml) was pumped through the other jet at a delivery rate of 125 ml/minute. The cerium-iron solution was purged from the delivery line with a 15 ml distilled water chase. Then a 50% $H_2O_2$ solution was pumped into the reactor at 9.38 ml/minute using a third jet and was followed by a brief distilled water flush. The reaction mixture was held at 70° C. for an additional sixty minutes, after which time it was cooled to 20° C., providing a stable $Ce_{0.6}Fe_{0.4}O_{2-\delta}$ aqueous nanoparticle colloidal dispersion, wherein δ is between about 1.5 to 2. The final dispersion was a clear, dark brown aqueous liquid that was washed and concentrated by diafiltration to an ionic conductivity of less than about 12 mS/cm and a pH of about 4.5.

Transmission electron microscopy (TEM) grain sizing revealed a particle size of 2.5±0.5 nm. Electron diffraction revealed a distinct $CeO_2$ cubic fluorite electron diffraction pattern. No electron diffraction peaks characteristic of a crystalline iron oxide phase were detected. Ultra-high resolution TEM and electron energy loss spectroscopy revealed a plurality of composite nanoparticles comprised of crystalline cerium oxide rich regions and amorphous iron oxide rich regions.

Example 1

Extraction of $Ce_{0.6}Fe_{0.4}O_{(2-\delta)}$ with Oleic Acid and DEGME

A 100 ml aliquot of $Ce_{0.6}Fe_{0.4}O_{(2-\delta)}$ aqueous nanoparticle dispersion prepared as described above, was added to a 500 ml reaction vessel and heated to a temperature of about 60° C. A 74.0 ml aliquot of Kensol® 50H and 37.6 g of oleic acid were then added, these two materials being at room temperature at the time of addition. The mixture was stirred by manual shaking of the vessel for a period of 1 minute, forming an emulsion. The emulsion mixture was then held at 40° C. to age for 2 hours. Then, 30 ml of DEGME was added to the emulsion and it separated in about 4 hours to yield a stable dark brown non-turbid substantially non-polar colloid phase, above a nearly colorless aqueous phase. The non-polar colloid phase was separated out by pipette.

To 100 ml of the separated organic colloid phase were added 13.9 ml of DEGME and 7.2 ml of PGME. Long-term stability observations of samples of the above non-polar colloid were carried out while samples were held in separate 10 ml vials. One was held at room temperature (about 20° C.) and the other at 40° C. At the conclusion of 6 months, the non-polar colloids, remained essentially non-turbid and free of settled precipitates.

Example 2

Extraction of $Ce_{0.6}Fe_{0.4}O_{(2-\delta)}$ with Oleic Acid and DEGME

A 100 ml aliquot of $Ce_{0.6}Fe_{0.4}O_{(2-\delta)}$ aqueous nanoparticle dispersion prepared as described above, was added to a 500 ml reaction vessel and heated to a temperature of about 60° C. A 75.0 ml aliquot Kensol® 50H and 35.9 g of oleic acid were then added, these two materials being at room temperature at the time of addition. The mixture was stirred by manual shaking of the vessel for a period of 1 minute. The emulsion mixture was then held at 40° C. to age for 2 hours. Then, 30 ml of DEGME was added to the emulsion and it was returned to 40° C., thereafter it completely separated in about 4 hours to yield a stable dark brown non-turbid substantially non-polar colloid phase, above a nearly colorless aqueous phase. The non-polar colloid phase was separated out by pipette. To 100 ml of the separated organic colloid phase were added 12.2 ml of DEGME and 9.1 ml of PGME.

Long-term stability observations of samples of the above non-polar colloid were carried out while samples were held in separate 10 ml vials, one at room temperature (about 20° C.) and the other at 40° C. At the conclusion of 6 months, the non-polar colloids, remained essentially non-turbid and free of settled precipitates. Cold temperature stability was also checked at −17° C. and it was found that the sample remained a non-turbid liquid, free of precipitates.

Example 3

Extraction of $Ce_{0.6}Fe_{0.4}O_{(2-\delta)}$ with Oleic Acid and DEGME

A 500 ml aliquot of $Ce_{0.6}Fe_{0.4}O_{(2-\delta)}$ aqueous nanoparticle dispersion prepared as described above, was heated to a temperature of about 60° C. and transferred to a 2 L reaction vessel. The liquid was stirred with a 1 9/16" R100 (Rushton) impeller that was lowered into the reactor vessel. The mixer head was positioned slightly above the bottom of the reactor vessel. The mixer was set to 1690 rpm. A mixture of 370 ml of Kensol® 50H and 188 g of oleic acid, at room temperature, was added to the vessel over a 30 second period. The whole mix was then stirred at 1750 rpm for 2 minutes resulting in the formation of an emulsion. The reaction vessel was then moved to hot plate with magnetic stirrer and stirred using a 2½" magnetic bar at high speed setting. 50 ml of DEGME was then added over 15 seconds. The vessel was then held without stirring at a temperature of about 45° C. After about 4 hours, the emulsion separated completely to yield about 600 ml of dark brown non-turbid organic colloid above an aqueous remnant phase.

Analysis of the organic colloid by Gas Chromatography Mass Spectrometry revealed no detectable amount of methoxyacetic acid, the nanoparticle stabilizer present in the $Ce_{0.6}Fe_{0.4}O_{(2-\delta)}$ aqueous nanoparticle dispersion prepared as described above. This reduction in methoxyacetic acid in the final organic colloid was accompanied by an improvement in long-term stability relative to organic dispersions of similar nanoparticles prepared by the solvent shifting process described by Alston et al. in US Pat. Publication 2010/0152077.

Example 4

Ambient Temperature Extraction of $Ce_{0.6}Fe_{0.4}O_{(2-\delta)}$ with Heptanoic Acid A 20 ml aliquot of $Ce_{0.6}Fe_{0.4}O_{(2-\delta)}$ aqueous nanoparticle dispersion prepared as described above, was added to a 40 ml glass vial at room temperature. To that was added 7.3 ml of heptanoic acid, the contents were shaken by hand for 30 sec, forming an emulsion. Then 13.2 ml of Kensol® 50H solvent was added, and the mixture was shaken again by hand for 30 sec, forming an emulsion. Upon standing for 5 minutes, the emulsion mixture was observed to separate into a dark brown upper layer and a clear light yellow lower layer. All of the materials used in this example were at an ambient temperature of about 20° C.

Example 5

Ambient Temperature Extraction of $Ce_{0.6}Fe_{0.4}O_{(2-\delta)}$ with a Heptanoic Acid and Kensol® 50H Mixture A 10 ml aliquot of $Ce_{0.6}Fe_{0.4}O_{(2-\delta)}$ aqueous nanoparticle dispersion prepared as described above, was added to a 40 ml glass vial at room temperature. A mixture of 6.6 ml of Kensol® 50H and 3.7 ml of heptanoic acid was added to the vial, the contents were shaken by hand for 30 sec, forming an emulsion. The emulsion mixture was allowed to separate over night. A dark brown organic upper layer formed over a light brown aqueous lower layer. All of the materials used in this example were at an ambient temperature of about 20° C.

While some extraction of the cerium- and iron-containing nanoparticles was achieved, the extraction was much slower and less efficient compared to the sequential addition method used in Example 4.

Example 6

Ambient Temperature Extraction of $Ce_{0.6}Fe_{0.4}O_{(2-\delta)}$ with Octanoic Acid An aliquot of 5 ml of aqueous colloid of $Ce_{0.6}Fe_{0.4}O_{(2-\delta)}$ prepared as described above, having a temperature of about 20° C. was added to a 15 ml vial. To that was added 1.83 ml of octanoic acid. The vial and contents were shaken by hand for 30 sec, thereby forming an emulsion. The emulsion then separated within seconds forming a dark upper organic phase over a nearly colorless yellow aqueous remnant phase. Next, 3.3 ml of Kensol® 50H was added to the vial, followed by 30 seconds of shaking. Again a formed emulsion separated in seconds to produce a dark upper phase above a light yellow aqueous remnant.

Long-term stability observations of samples of the above non-polar colloid were carried out while samples were held in separate 10 ml vials. One was held at room temperature (about 20° C.) and the other at 40° C. At the conclusion of 6 months, the non-polar colloids remained essentially non-turbid and free of settled precipitates.

Example 7

Ambient Temperature Extraction of $Ce_{0.6}Fe_{0.4}O_{(2-\delta)}$ with Octanoic Acid and Kensol® 50H Mixture A 10 ml aliquot of $Ce_{0.6}Fe_{0.4}O_{(2-\delta)}$ aqueous nanoparticle dispersion prepared as described above, was added to a 40 ml glass vial at room temperature. A mixture of 6.6 ml of Kensol® 50H and 3.7 ml of octanoic acid was added to the vial, the contents were shaken by hand for 30 sec, forming an emulsion. The emulsion mixture was allowed to separate over night. A dark brown organic upper layer formed over a translucent brown aqueous lower layer. All of the materials used in this example were at an ambient temperature of about 20° C.

While some extraction of the cerium- and iron-containing nanoparticles was achieved, the extraction was much slower and less efficient compared to the sequential addition method used in Example 6.

Example 8

Scale-Up Extraction of $Ce_{0.6}Fe_{0.4}O_{(2-\delta)}$ with Octanoic Acid

A 12 liter aliquot of $Ce_{0.6}Fe_{0.4}O_{(2-\delta)}$ aqueous nanoparticle dispersion prepared as described above, was heated to a temperature of 60° C. and transferred to a 60 liter stainless steel reaction vessel. The dispersion was stirred at about 500 to 1000 rpm using a 4" R100 (Rushton) mixer. Then 4116 ml of octanoic acid was added to the mixing vortex. Next 7944 ml of Kensol® 50H was added. The mixer speed was increased to about 1400 rpm and the mixture was stirred for 5 minutes. The temperature of the reaction mixture dropped as a result of the additions of room temperature materials, but remained above 40° C. The mixer was turned off and the mixture was held for 5 minutes. The contents were found to separate into a substantially non-polar colloid phase above a remnant aqueous phase. The colorless aqueous phase was drained from the reaction vessel and the substantially non-polar colloidal was collected. A small sample was taken from the non-polar colloidal and the percent solids content was determined.

The solids content of the non-polar colloidal was then adjusted to 3.5% solids by the addition of the appropriate amount of octanoic acid and Kensol® 50H. The volume ratio of octanoic acid and Kensol® 50H was the same as described earlier. Subsequently, a mixture of 6.0 wt % PIBSA (polyisobutylene succinic anhydride) and 15 ppm Stadis 450 in Kensol 50H was added to bring the solids content down to 2.0 wt %.

Stability of the final non-polar colloid phase was found to be excellent after a two month period, remaining non-turbid and free of settled precipitates.

Example 9

Use of Glycol Ether Addenda

A 22.7 ml aliquot $Ce_{0.6}Fe_{0.4}O_{(2-\delta)}$ aqueous nanoparticle dispersion prepared as described above, was heated to a temperature of 60° C. and transferred to a reaction vessel. To that was added 10.7 ml of octanoic acid. The vessel and contents were shaken by hand for 30 sec, forming an emulsion. The emulsion then separated within seconds forming a dark upper organic phase over a nearly colorless yellow aqueous remnant phase. Next, 24.5 ml of Kensol® 50H was added to the vessel, followed by 30 seconds of shaking. The formed emulsion separated in seconds into two phases, a dark upper substantially non-polar colloidal phase above an aqueous remnant. 36 ml the organic substantially non-polar colloidal phase was separated out by pipetting. Next, 2.67 g of propylene glycol monomethyl ether (PGME) and 1.78 g of diethylene glycol monomethyl ether (DEGME) were added to the organic substantially non-polar colloid.

Long-term stability observations of a 10 ml sample of the above non-polar colloid were carried out. Behavior of the non-polar colloid at −19° C. was also studied and it was found to remain a clear single phase liquid under this condition.

Example 10

Ambient Temperature Extraction of $Ce_{0.6}Fe_{0.4}O_{(2-\delta)}$ with 2-Ethylhexanoic Acid A 20 ml aliquot of $Ce_{0.6}Fe_{0.4}O_{(2-\delta)}$ aqueous nanoparticle dispersion prepared as described above, was added to a 40 ml glass vial at room temperature. To that was added 7.3 ml of 2-ethylhexanoic acid, the contents were shaken by hand for 30 sec, forming an emulsion. Then 13.2 ml of Kensol® 50H solvent was added, and the mixture was shaken again by hand for 30 sec, forming an emulsion. Upon standing for 1-2 hours, the emulsion mixture was observed to separate into a translucent brown upper organic layer and a dark muddy brown aqueous lower layer. All of the materials used in this example were at an ambient temperature of about 20° C.

Thus, a substantially incomplete transfer of nanoparticles from the acidic aqueous phase to the low polarity phase resulted; and a relatively slow phase separation of the substantially non-polar colloid phase from the remnant aqueous phase were achieved at ambient temperature.

The invention has been described in detail, with particular reference to certain preferred embodiments thereof, but it will be understood that variations and modifications can be effected within the scope of the invention as described above, by a person of ordinary skill in the art, without departing from the scope of the invention.

What is claimed is:

1. A process for preparing a colloidal dispersion, comprising:
   (a) mixing an aqueous colloidal dispersion of cerium-containing oxide nanoparticles and an amphiphilic material to form an emulsion, wherein the amphiphilic material is a monocarboxylic acid having from 7 to 9 carbon atoms;
   (b) adding a substantially non-polar solvent to the emulsion formed in step (a) and mixing to form a second emulsion, whereafter said second emulsion separates into a substantially non-polar colloidal phase comprising the cerium-containing nanoparticles dispersed in the non-polar solvent and a remnant aqueous phase, wherein said second emulsion is formed at a temperature ranging from about 20° C. to about 40° C.; and,
   (c) collecting the separated substantially non-polar colloidal phase comprising the cerium-containing oxide nanoparticles dispersed in the non-polar solvent.

2. The process of claim 1, wherein said second emulsion is formed over a time ranging from 0 to 8 hours.

3. The process of claim 1, further comprising adding a glycol ether to the substantially non-polar colloidal phase.

4. The process of claim 3, wherein said glycol ether is added 0 to 4 hours after the end of step (b).

5. The process of claim 3, wherein said glycol ether is selected from the group consisting of diethylene glycol monomethyl ether, propylene glycol monomethyl ether, diethylene glycol monoethyl ether, diethylene glycol monobutyl ether, dipropylene glycol methyl ether, ethylene glycol monomethyl ether, ethylene glycol monoethyl ether, ethylene glycol monopropyl ether, and combinations thereof.

6. The process of claim 5, wherein said glycol ether is selected from the group consisting of diethylene glycol monomethyl ether, propylene glycol monomethyl ether, and a mixture thereof.

7. The process of claim 5, wherein said glycol ether comprises about 5-25 wt. % of the substantially non-polar solvent, the amphiphilic material, and the glycol ether.

8. The process of claim 1, wherein said monocarboxylic acid is 2-ethylhexanoic acid, heptanoic acid or octanoic acid.

9. The process of claim 1, wherein said second emulsion is formed at ambient temperature.

10. The process of claim 1, wherein the amount of said monocarboxylic acid comprises about 25-33 wt. % of the substantially nonpolar solvent and the amphiphilic material.

11. The process of claim 1, wherein step (b) is performed 0 to 1 hour after the end of step (a).

12. The process of claim 1, wherein said cerium-containing oxide nanoparticles have a nominal composition of $Ce_{(1-x)}Fe_xO_{(2-\delta)}$, wherein x ranges from about 0.01 to 0.8 and $(2-\delta)$ ranges from about 1 to 2.

13. The process of claim 1, wherein said aqueous colloidal dispersion of cerium-containing oxide nanoparticles is prepared without a conventional nanoparticle isolation step.

14. The process of claim 1, wherein said aqueous colloidal dispersion of cerium-containing oxide nanoparticles has a pH less than or equal to seven.

15. The process of claim 1, wherein said substantially non-polar solvent is added after the emulsion formed in step (a) has separated into an organic colloid phase and an aqueous remnant phase.

* * * * *